(12) United States Patent
Justus

(10) Patent No.: US 9,316,408 B2
(45) Date of Patent: Apr. 19, 2016

(54) ENERGY SUPPLY MODULE AND METHOD OF ASSEMBLING THE SAME

(71) Applicant: Charles Robert Justus, Wildwood, MO (US)

(72) Inventor: Charles Robert Justus, Wildwood, MO (US)

(*) Notice: Subject to any disclaimer, the term of this patent is extended or adjusted under 35 U.S.C. 154(b) by 107 days.

(21) Appl. No.: 14/192,111

(22) Filed: Feb. 27, 2014

(65) Prior Publication Data

US 2015/0241085 A1    Aug. 27, 2015

(51) Int. Cl.
| | | |
|---|---|---|
| *B60L 1/02* | (2006.01) | |
| *F01K 15/00* | (2006.01) | |
| *F01K 17/02* | (2006.01) | |
| *F02C 6/00* | (2006.01) | |
| *F02C 6/18* | (2006.01) | |
| *H02K 15/00* | (2006.01) | |
| *A47J 27/00* | (2006.01) | |
| *A47J 31/54* | (2006.01) | |
| *F24H 1/18* | (2006.01) | |
| *F02B 63/04* | (2006.01) | |
| *F03G 7/08* | (2006.01) | |
| *H02K 7/18* | (2006.01) | |
| *F24H 1/06* | (2006.01) | |
| *H02K 5/02* | (2006.01) | |
| *F24H 9/14* | (2006.01) | |
| *F24H 1/08* | (2006.01) | |
| *F24H 9/02* | (2006.01) | |
| *F24H 9/00* | (2006.01) | |

(52) U.S. Cl.
CPC .. *F24H 1/06* (2013.01); *F24H 1/08* (2013.01); *F24H 9/0094* (2013.01); *F24H 9/02* (2013.01); *F24H 9/148* (2013.01); *H02K 5/02* (2013.01); *H02K 15/00* (2013.01); *F02B 63/044* (2013.01); *F24H 2240/06* (2013.01); *Y10T 29/49009* (2015.01)

(58) Field of Classification Search
CPC .... F02B 63/04; F02B 2063/045; F02B 75/16; Y02E 20/14; F01D 15/10; F02G 5/02; H02K 15/16; H02K 15/024; H02K 15/12; F24H 9/2021; F24H 1/182; H05B 3/00
USPC ............. 290/1 A, 2; 29/596; 392/441; 174/50
See application file for complete search history.

(56) References Cited

U.S. PATENT DOCUMENTS

| | | | | |
|---|---|---|---|---|
| 1,380,123 | A * | 5/1921 | Sullivan | 290/1 A |
| 1,456,652 | A * | 5/1923 | Rossman | 290/2 |
| 3,242,345 | A * | 3/1966 | Kimura et al. | 290/2 |
| 3,602,730 | A * | 8/1971 | Cushing | 307/150 |
| 3,604,788 | A * | 9/1971 | Paige et al. | 359/218.1 |
| 3,925,679 | A * | 12/1975 | Berman et al. | 290/1 R |
| RE30,229 | E * | 3/1980 | Berman et al. | 290/1 R |
| 4,226,214 | A * | 10/1980 | Palazzetti | 123/2 |
| 4,339,307 | A * | 7/1982 | Ellis, Jr. | 202/176 |

(Continued)

*Primary Examiner* — Tulsidas C Patel
*Assistant Examiner* — Charles Reid, Jr.
(74) *Attorney, Agent, or Firm* — Armstrong Teasdale LLP

(57) ABSTRACT

An energy supply module is configured to provide at least one of electricity and hot water to at least one load coupled thereto. The energy supply module includes a plurality of frame members that define an upper level and a lower level. The energy supply module also includes an engine positioned on the upper level and a generator coupled to the engine and also positioned on the upper level. The generator is configured to generate a supply of electricity for distribution to the at least one load. The energy supply module further includes a hot water heater positioned on the upper level, wherein the hot water heater is configured to provide a supply of hot water to the at least one load.

20 Claims, 10 Drawing Sheets

(56) References Cited

U.S. PATENT DOCUMENTS

| | | | |
|---|---|---|---|
| 4,496,845 A * | 1/1985 | Ensign et al. | 290/43 |
| 4,503,337 A * | 3/1985 | H/a/ fner et al. | 290/4 D |
| 4,548,164 A * | 10/1985 | Ylonen et al. | 123/2 |
| 4,657,290 A * | 4/1987 | Linden | 290/2 |
| 4,708,094 A * | 11/1987 | Helmich et al. | 123/27 GE |
| 4,736,111 A * | 4/1988 | Linden | 290/2 |
| 4,951,871 A * | 8/1990 | Hata et al. | 237/12.1 |
| 5,515,235 A * | 5/1996 | Stoller | 361/605 |
| 5,669,221 A * | 9/1997 | LeBleu et al. | 62/92 |
| 5,719,990 A | 2/1998 | Yang | |
| 5,907,970 A * | 6/1999 | Havlovick et al. | 74/16 |
| 6,084,313 A * | 7/2000 | Frank | 290/40 C |
| 6,441,505 B1 | 8/2002 | Poletti et al. | |
| 6,954,003 B2 * | 10/2005 | Dull et al. | 290/4 R |
| 7,081,682 B2 * | 7/2006 | Campion | 290/1 A |
| 7,291,932 B2 * | 11/2007 | Wurtele et al. | 290/1 B |
| 7,432,606 B2 | 10/2008 | Yamamoto et al. | |
| 7,989,969 B2 * | 8/2011 | Grant et al. | 290/1 A |
| D656,897 S * | 4/2012 | Trine et al. | D13/116 |
| 8,154,137 B1 * | 4/2012 | Flegel | 290/1 A |
| D668,224 S * | 10/2012 | Trine et al. | D13/122 |
| 8,280,237 B2 * | 10/2012 | Tanaka et al. | 392/496 |
| D671,078 S * | 11/2012 | Brown | D13/160 |
| 8,319,357 B2 * | 11/2012 | Usselman et al. | 290/1 A |
| 8,373,289 B2 | 2/2013 | Hunter | |
| 8,391,012 B2 * | 3/2013 | Trine et al. | 361/735 |
| 8,487,455 B2 | 7/2013 | Trinkner | |
| 8,616,159 B1 * | 12/2013 | Hawkins | 123/2 |
| 8,739,521 B2 * | 6/2014 | Umeno | 60/320 |
| 8,872,366 B2 * | 10/2014 | Campion et al. | 290/1 A |
| 8,890,342 B2 * | 11/2014 | Alenezi | 290/1 A |
| 8,935,995 B1 * | 1/2015 | Hawkins | 123/2 |
| 8,963,348 B2 * | 2/2015 | Kawakita et al. | 290/1 A |
| 9,006,913 B2 * | 4/2015 | Takita | 290/1 A |
| 2002/0167174 A1 * | 11/2002 | Haass et al. | 290/1 A |
| 2003/0062352 A1 * | 4/2003 | Kislovsky et al. | 219/130.21 |
| 2003/0184094 A1 * | 10/2003 | Sodemann et al. | 290/1 A |
| 2005/0082833 A1 * | 4/2005 | Sodemann et al. | 290/1 A |
| 2005/0098643 A1 * | 5/2005 | Guyer | 237/12.1 |
| 2005/0151374 A1 * | 7/2005 | Ambrose | 290/1 A |
| 2006/0054113 A1 * | 3/2006 | Yasuda et al. | 123/41.65 |
| 2008/0047272 A1 * | 2/2008 | Schoell | 60/648 |
| 2008/0048456 A1 | 2/2008 | Browning et al. | |
| 2010/0060015 A1 | 3/2010 | Buker | |
| 2010/0110634 A1 * | 5/2010 | Woodbury et al. | 361/698 |
| 2010/0275823 A1 * | 11/2010 | Pahls | 110/233 |
| 2011/0057454 A1 * | 3/2011 | Kawakita et al. | 290/1 A |
| 2011/0095540 A1 * | 4/2011 | Jackson et al. | 290/1 A |
| 2011/0242769 A1 * | 10/2011 | Trine et al. | 361/728 |
| 2014/0203567 A1 * | 7/2014 | Lemus | 290/1 A |

* cited by examiner

ENERGY SUPPLY MODULE AND METHOD OF ASSEMBLING THE SAME

BACKGROUND OF THE INVENTION

This invention relates to an energy supply module for providing electrical energy to at least one load, and more specifically, to a self-contained, portable energy supply module that facilitates cost efficient and rapid deployment to a desired location.

At least some known electrical generators are used to convert mechanical energy into electrical energy. For example, a generator may be used as a backup power source when a primary power source has failed or as a primary power source where traditional utility generated power is either unavailable or doesn't provide sufficient reliability or quantity. Further, at least some known electrical generators are portable for transport to locations where supplemental electricity is required, such as construction or industrial sites, entertainment events, and disaster recovery sites. Conventional generators used for such purposes are often of such size such that a standard-sized truck is only able to transport a single generator, or possibly a pair of generators, at any one time. Moreover, such conventional generators typically require a crane to load and unload the generator from the truck and may require an additional mode of transportation to carry the other equipment associated with the generator, such as cabling and electrical connectors. Therefore, the deployment of at least some known electrical generators may be an expensive and time consuming process.

Furthermore, at least some known electrical generators supply only electrical energy to various loads at a location. However, in many cases, such as disaster relief efforts, users may also be in need of hot water for various uses. A location having a generator that supplies electricity only would need to also include a hot water heater, which adds to expenses and requires valuable space to operate that may be better suited to other uses.

Additionally, at least some known electrical generators include an electrical panel which couples the generator to the load. However, many generators require a number of additional electrical panels and cabling in order to break down the raw electric supplied from the generator to the circuits needed by the user. Such restrictions may limit the positioning of the generator to less than ideal locations, or may require transporting additional cabling or an additional generator to the site, which increases the induced costs to a user.

BRIEF DESCRIPTION

In one aspect, an energy supply module configured to provide at least one of electricity and hot water to at least one load coupled thereto is provided. The energy supply module includes a plurality of frame members that define an upper level and a lower level. The energy supply module also includes an engine positioned on the upper level and a generator coupled to the engine and also positioned on the upper level. The generator is configured to generate a supply of electricity for distribution to the at least one load. The energy supply module further includes a hot water heater positioned on the upper level, wherein the hot water heater is configured to provide a supply of hot water to the at least one load.

In another aspect, an energy supply module configured to provide electricity to at least one load coupled thereto is provided. The energy supply module includes a plurality of frame members that define an upper level and a lower level. The energy supply module also includes an engine positioned on the upper level and a generator coupled to the engine and also positioned on the upper level. The generator is configured to generate a supply of electricity for distribution to the at least one load. The energy supply module further includes a pair of electric control panels coupled to the generator and positioned on opposing sides of the energy supply module. Each electric control panel includes at least one of a plurality of power distribution panels removably coupled thereto, wherein each of the plurality of power distribution panels includes a plurality of electrical connectors configured to receive a corresponding connector from the at least one load.

In yet another aspect, a method of assembling an energy supply module configured to provide electricity to at least one load coupled thereto is provided. The method includes defining an upper level and a lower level of the energy supply module with a plurality of frame members. The method also includes positioning an engine on the upper level and coupling a generator to the engine, wherein the generator is configured to generate a supply of electricity for distribution to the at least one load. The method further including coupling a pair of electric control panels to opposing sides of the energy supply module the generator, and removably coupling at least one of a plurality of power distribution panels to each electric control panel. Each of the plurality of power distribution panels includes a plurality of electrical connectors configured to receive a corresponding connector from the at least one load.

DETAILED DESCRIPTION

The following detailed description illustrates embodiments of the invention by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an exemplary embodiment, namely, a self-contained portable energy supply module that provides a cost efficient and convenient method to provide electricity and hot water to areas where such luxuries are unavailable. However, it is contemplated that this disclosure has general application to power generation systems in industrial, commercial, and residential applications.

Figure 1:
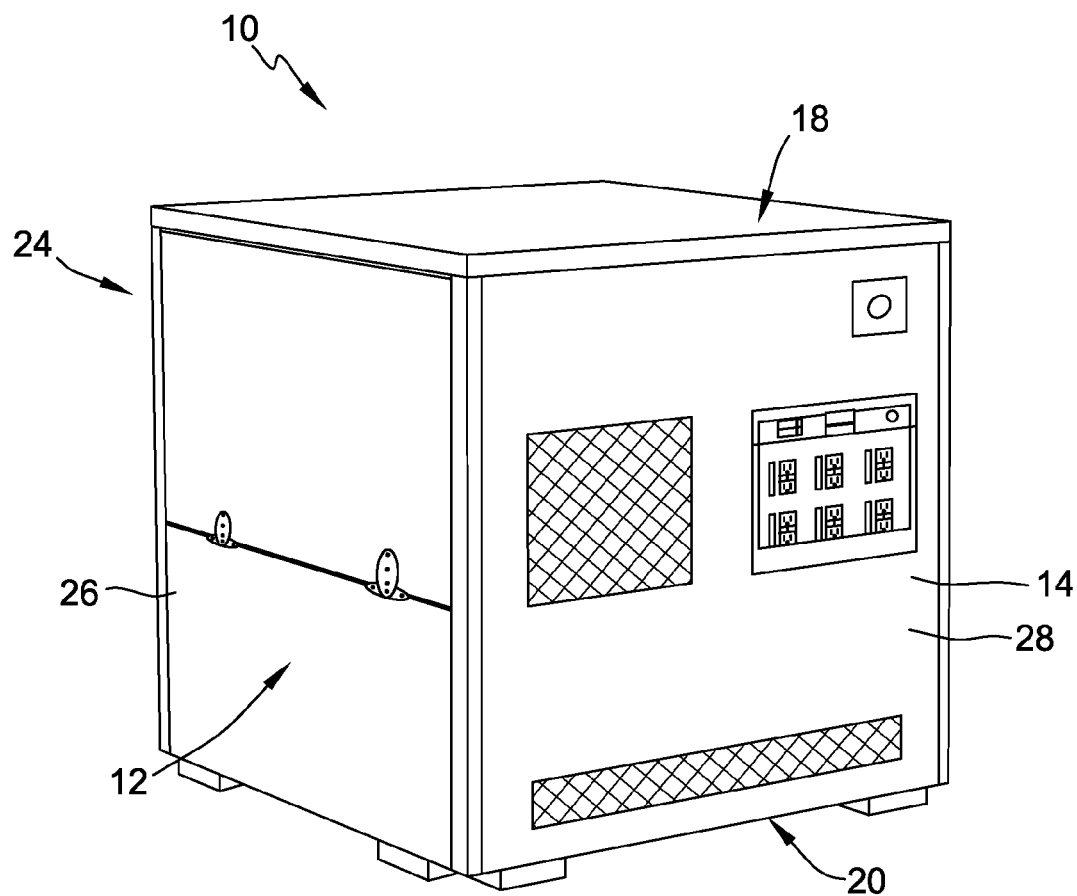
FIG. 1 is a perspective view of an exemplary energy supply module.
Figure 2:
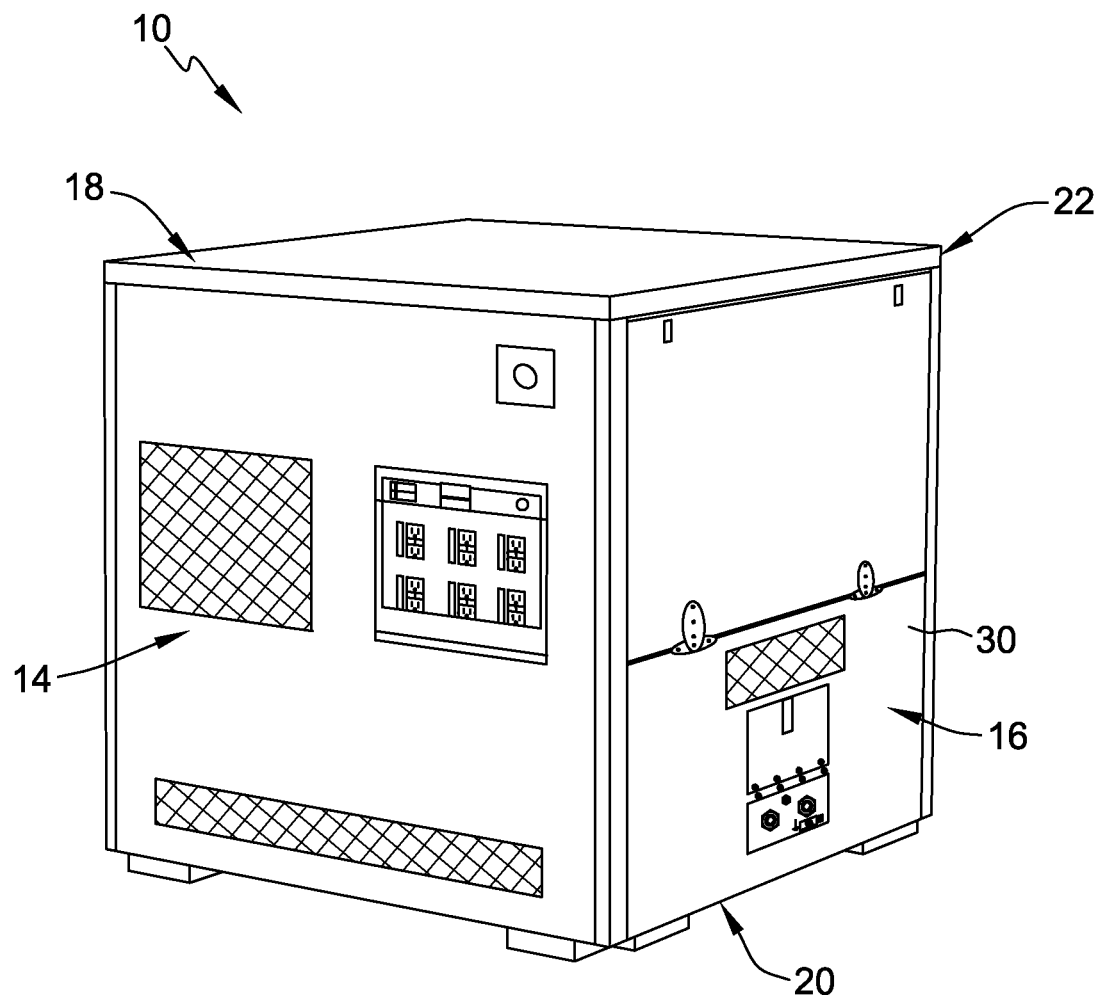
FIG. 2 is a rotated perspective view of the exemplary energy supply module shown in FIG. 1.

FIG. 1 is a perspective view of an exemplary energy supply module 10 illustrating a first side 12 and a first end 14. FIG. 2 is a rotated perspective view of energy supply module 10 illustrating first end 14 and a second side 16. Module 10 also includes a top surface 18, a bottom surface 20, and a second end 22. In the exemplary embodiment, module 10 includes a housing 24 coupled to a plurality of frame members (not shown in FIGS. 1 and 2) such that first side 12 includes a first side wall 26, first end 14 includes a first end wall 28, second side 16 includes a second side wall 30, and the second end includes a second end wall (not shown in FIGS. 1 and 2). Housing 24 is configured to protect components on the interior of module 10 from its surrounding environment including moisture and physical impact. As such, in the exemplary embodiment, housing 24 is manufactured from a durable material, such as, but not limited to, stainless steel, carbon steel, aluminum, or any combination thereof. Alternatively, housing 24 may be manufactured from any suitable material that facilitates operation of energy supply module 10 as described herein.

In the exemplary embodiment, module 10 is configured to supply electrical energy to at least one load at locations where a primary energy source has failed, or where supplemental energy is required. As used herein, the term "load" is meant to describe any apparatus or device coupled to module 10 for receiving a utility, such as electrical energy or hot water, from module 10. Such locations may be, but are not limited to, at construction or industrial sites, entertainment events, and disaster recovery sites. Furthermore, module 10 is significantly smaller than known generators, which provides for greater portability. In the exemplary embodiment, module 10 is substantially a 50 inch (in.) cube such that module 10 may be stacked during transport. Alternatively, energy supply module 10 may be any shape or size that facilitates operation of module 10 as described herein. Generally, energy supply module 10 is sized to facilitate stacking modules 10 two units high by two units wide on a typical transport truck. In such a configuration, twenty-four to forty-eight modules 10 may be loaded onto the back of a typical forty eight foot flat bed or step deck semi-truck for transport to a desired location. As such, the size of energy supply module 10 facilitates simple, low-cost transport of multiple modules 10 as compared to known generators.

Figure 3:
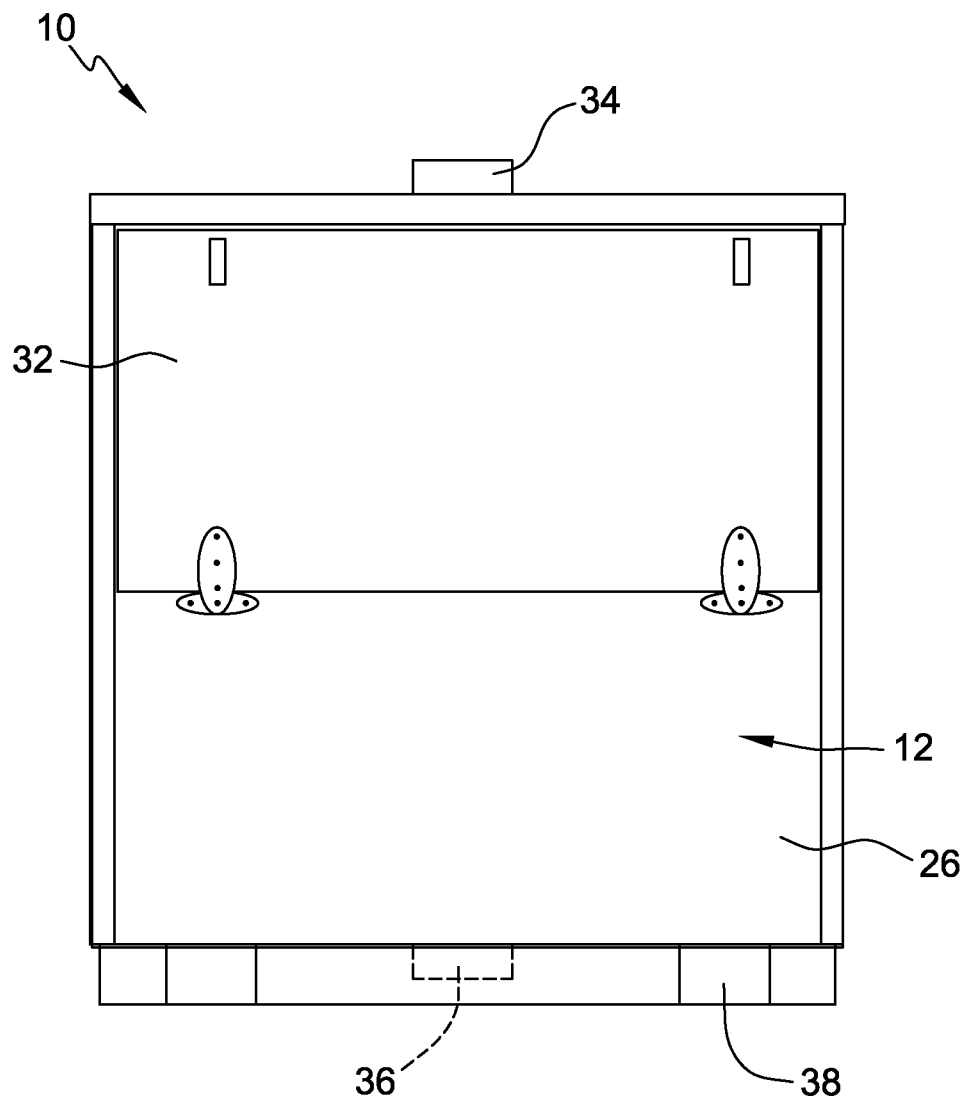
FIG. 3 is a schematic first side view of an exterior of the exemplary energy supply module shown in FIG. 1.

FIG. 3 is a schematic view of an exterior of first side 12. In the exemplary embodiment, an upper portion of housing first side wall 26 includes a hinged panel 32 that is configured to open to provide a user access to an interior of module 10. Energy supply module 10 also includes a lift pin 34 positioned on top surface 18 and a stacking sleeve 36 positioned on bottom surface 20. In the exemplary embodiment, lift pin 34 is centrally located on top surface 18 and is configured to serve as a single lifting point for module 10. The single lifting point provides simplified lifting of module 10 by a crane or other equipment at the desired location. Furthermore, as described above, the relatively smaller size of module 10 allows it to be lifted and moved by smaller pieces of equipment than a crane, such as, but not limited to a forklift, which may be required to move larger known generators. Additionally, as described above, at least one of the embodiments disclosed herein includes the realization that, in some applications, users may stack a number of energy supply modules 10 vertically for storage or transportation in order to minimized space at a particular facility or on a transport vehicle. Thus, two or more modules 10 may be stacked one on top of the other such that lift pin 34 of the lower module 10 engages the corresponding stacking sleeve 36 of the upper module 10 for storage purposes.

In the exemplary embodiment, energy supply module 10 further includes a plurality of transport openings 38 coupled to bottom surface 20. Transport openings 38 are configured to receive a transport means for faster and easier loading, unloading, and moving of module 10. Specifically, transport openings 38 are configured to receive the forks of a forklift or pallet jack. Alternatively, transport openings 38 may receive any transport means that facilitates operation of energy supply module 10 as described herein. In the exemplary embodiment, each side 12 and 16 and to each end 14 and 22 include a pair of transport openings 38 such that a portion of the transport means may be inserted into openings from any of sides 12 and 16 and ends 14 and 22.

Figure 4:
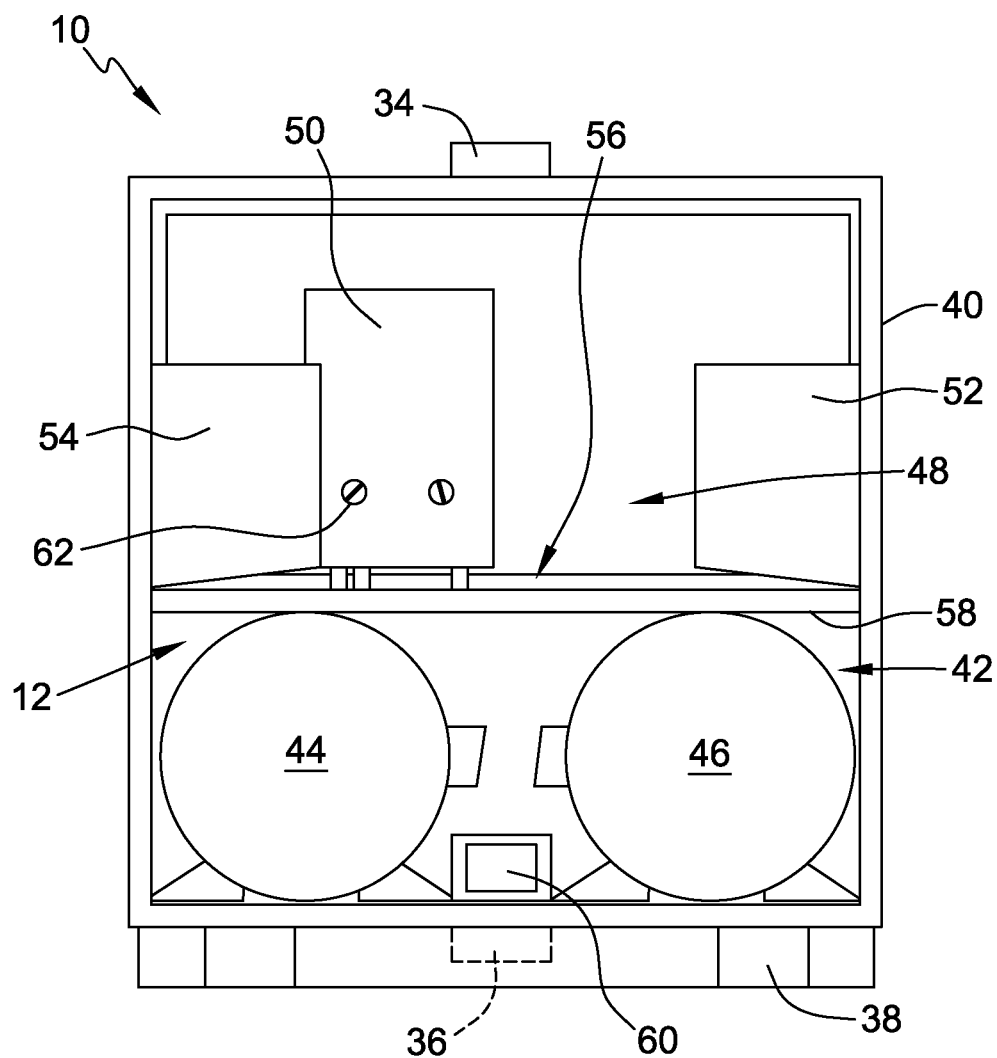
FIG. 4 is a schematic first side view of an interior of the exemplary energy supply module shown in FIG. 1.

FIG. 4 illustrates an interior view of first side 12 of energy supply module 10 with first side wall 26 and hinged panel 32 of housing 24 removed. In the exemplary embodiment, module 10 includes a plurality of frame members 40 that form two levels, a lower level 42 to house at least a first fuel tank 44 and a second fuel tank 46, and an upper level 48 to house at least one hot water heater 50 and at least a portion of a first control panel 52 and a second control panel 54. Control panels 52 and 54 are coupled to ends 14 and 22, respectively. In the exemplary embodiment, module 10 includes two control panels 52 and 54 and two fuel tanks 44 and 46. Alternatively, module 10 may include as many control panels and fuel tanks as necessary to facilitate module 10 operation as described herein. Levels 42 and 48 are divided by a dividing wall 56 and facilitate conserving space and decreasing the footprint required for energy supply module 10 as compared to known generators. More specifically, by sizing tanks 44 and 46 into a custom made module 10 and stacking them beneath at least hot water heater 50 and control panels 52 and 54, a single stack, compact unit is achieved. Typically, as least some known fuel tanks are positioned remote from known generators, which results in a large area to be required. This design eliminates the remote separation and thus reduces the footprint of energy supply module 10.

Upper level 48 also includes a storage area 58 defined between dividing wall 56 and top 18 configured to store equipment, such as, but not limited to, cabling that may be used with module 10. As such, any equipment that may be necessary for module 10 operation is able to be stored within storage area 58 and transported within module 10. Traditionally, equipment such as cabling required to operate known generators is transport to a desired site independently from the generator itself, therefore increasing transportation time and costs. Furthermore, frame members 40 are manufactured from stainless steel to facilitate increasing the stacking strength of module 10 to enable multiple modules to be stacked vertically, as described above. Alternatively, frame members 40 may be manufactured from any material that facilitates operation of module 10 as described herein. The ability to stack modules 10 for storage and transportation and to also store the required equipment for operation with module 10 itself simplifies and reduces the cost of transporting modules 10 to a desired site.

In the exemplary embodiment, the fuel contained in tanks 44 and 46 is compressed propane. Alternatively, the fuel contained within tanks 44 and 46 is not limited to any particular fuel type. Rather, the fuel may be, but is not limited to, any petroleum-based fuel, such as gasoline, diesel, jet fuel, kerosene, or liquefied natural gas, any biofuel, hydrogen, or fuel cells. Tanks 44 and 46 sized to provide fuel to components of module 10 for an extending period of operating time. Therefore, there is a desire to maximize the size of tanks 44 and 46 in order balance the desire for a reduced frequency of necessary and costly re-fuelings of energy supply module 10 with the desire to minimize the size of module 10 and its components. In addition, one or more tanks 44 and/or 46 of one energy supply module 10 may be coupled to one or more tanks 44 and/or 46 of another nearby module 10. As such, a plurality of interconnected energy supply modules 10 may be provided to produce a greater, cumulative electric power output than available through a single, isolated module 10. Moreover, an external fuel tank (not shown) may be coupled to energy supply module 10 to provide additional fuel that facilitates operating module 10 for a longer period of time than possible with only tanks 44 and 46. In the exemplary embodiment, module 10 further includes a fuel sensor 60 position in lower level 42 between tanks 44 and 46. Fuel sensor 60 is configured to sense the presence of fuel in lower level 42 due to a leak in one of tanks 44 or 46 and trigger an audible and/or visible alarm that indicates to a user that there is a leak while stopping the engine and fuel supply.

As described above, upper level 48 of first side 12 includes an on-demand hot water heater 50 and at least a portion of electric control panels 52 and 54 that are accessed by opening hinged panel 32 on the upper portion of first side wall 26. More specifically, first control panel 52 is coupled to first end wall 28 (shown in FIG. 1) and second control panel 54 is coupled to second end wall (not shown in FIG. 4). Control panels 52 and 54 are described in further detail below. In the exemplary embodiment, fuel from tanks 44 and 46 is channeled to hot water heater 50 to provide a heat source. Water heater 50 ignites the fuel using an independent battery such that no electrical power is used from a main electrical generator (not shown in FIG. 4) within module 10. Alternatively, water heater 50 may use electrical power from the generator to ignite the fuel. Furthermore, water heater 50 may receive electrical power from the generator to electrically heat the water such that heater 50 does not itself burn fuel. The burning fuel in water heater 50 facilitates increasing the temperature of water received via a water inlet (not shown in FIG. 4). Water heater 50 also includes at least one control 62 configured to allow a user to control the temperature and pressure of the water discharged by water heater 50.

Figure 5:
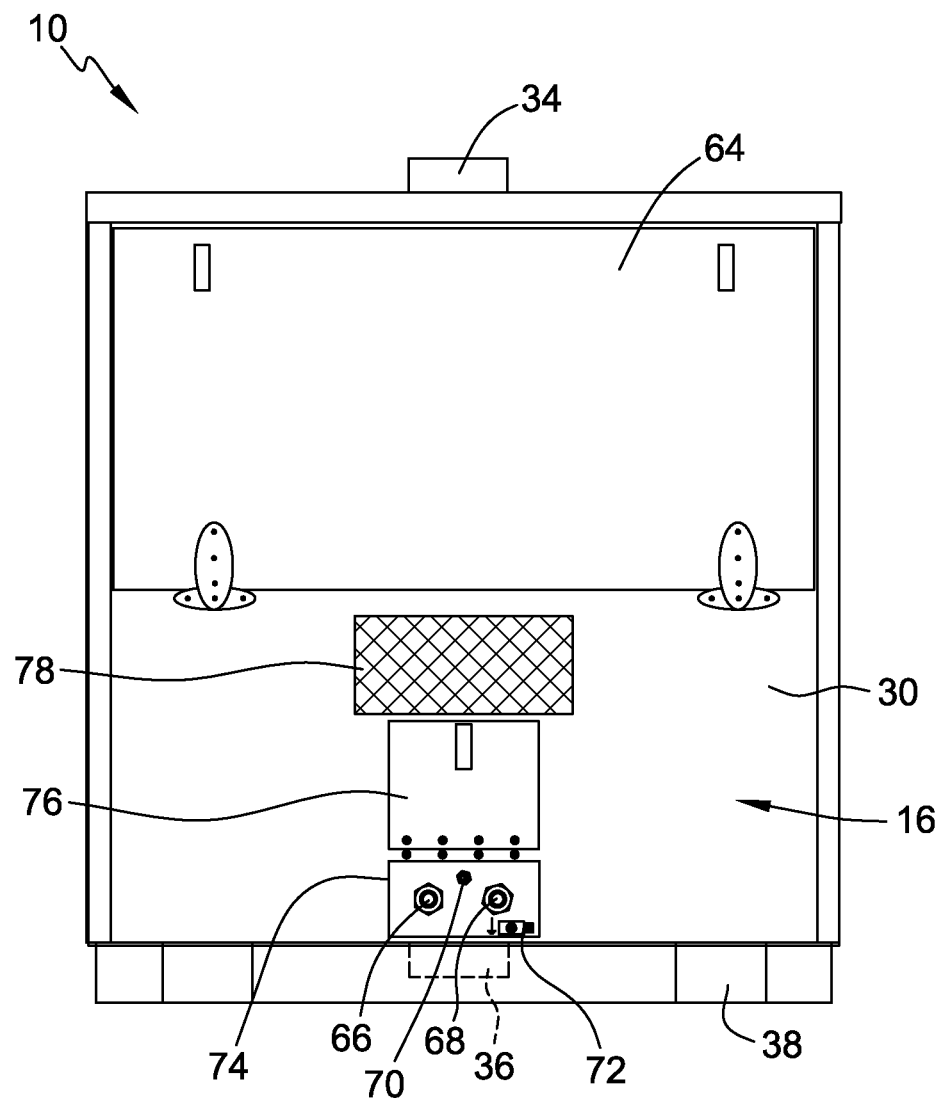
FIG. 5 is a schematic second side view of an exterior of the exemplary energy supply module shown in FIG. 1.

FIG. 5 is a schematic view of an exterior of second side 16. Second side 16 is opposite first side 12, as described above. In the exemplary embodiment, second side 16 includes second side wall 30 including a second hinged panel 64 defined in an upper portion of housing second side wall 30. Similar to hinged panel 32 (shown in FIG. 3), hinged panel 64 is configured to open to provide a user access to an interior of module 10. Furthermore, second side 16 also includes a pair of transport openings 38 configured to receive a transport means for faster and easier loading, unloading, and moving of module 10.

In the exemplary embodiment, second side 16 further includes a water inlet port 66 and a water outlet port 68. Inlet 66 is configured to receive water from an independent water supply (not shown) and channel the water to on-demand water heater 50 via tubing. Water heater 50 then heats the water to a desired temperature and channels it via additional tubing to outlet 68, which discharges the water to a desired location for use. Second side 16 also includes an external fuel tank port 70 configured to facilitate coupling an external fuel tank (not shown) to module 10 to provide for a longer operating duration. In the exemplary embodiment, external fuel tank port 70 may be coupled to at least one of fuel tanks 44 and/or 46 to channel fuel between the external tank and tanks inside module 10. Alternatively, external fuel tank port 70 may be coupled to an engine (not shown in FIG. 5) to channel fuel from the external tank directly into the engine for use. Furthermore, second side 16 includes a ground lug 72 configured to provide a ground for the electrical power generated within module 10. In the exemplary embodiment, water inlet 66 and outlet 68, external fuel tank port 70, and ground lug 72 are located on a utility panel 74 positioned proximate bottom surface 20 (shown in FIG. 1) on second side 16 to simplify the cabling and tubing required for use. Alternatively, each of water inlet 66 and outlet 68, external fuel tank port 70, and ground lug 72 may be located anywhere on energy supply module 10 to facilitate operation of module 10 as described herein.

Second side wall 30 also includes an access panel 76 defined therein configured to provide access to the interior of second side 16. More specifically, access panel 76 is configured to provide access to at least a fuel fill valve (not shown in FIG. 5) for re-filling of tanks 44 and 46. Furthermore, the lower portion of second side wall 30 further includes an exhaust vent 78 configured to provide an outlet for at least one of heat and exhaust generated by operating the engine within module 10.

Figure 6:
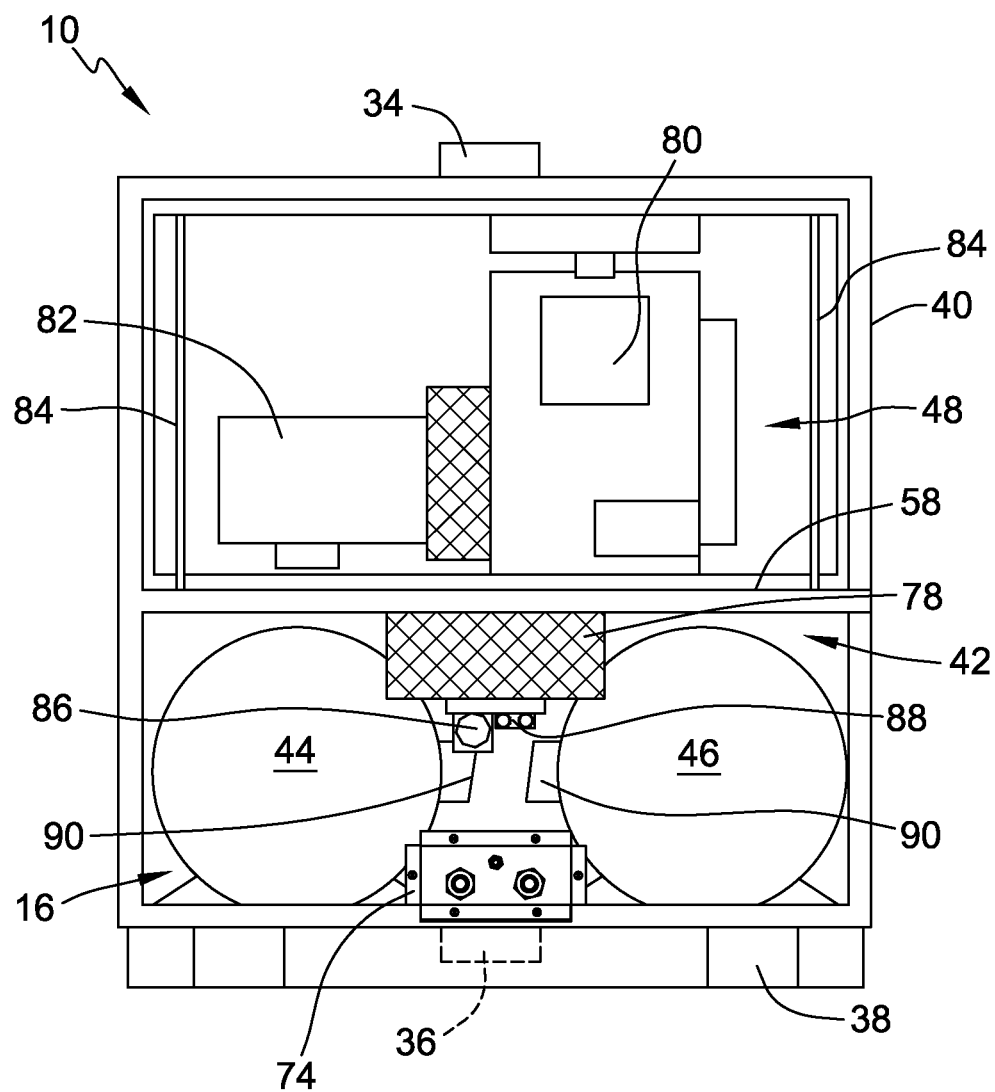
FIG. 6 is a schematic second side view of an interior of the exemplary energy supply module shown in FIG. 1.

FIG. 6 is a schematic view of an interior of second side 16 of energy supply module 10 with second side wall 30 removed for clarity. Utility panel 74 and exhaust vent 78 are coupled at least to frame members 40 such that vent 78, water inlet 66 and outlet 68, external fuel tank port 70, and ground lug 72 are accessible with second side wall 30 removed. As described above, energy supply module 10 includes an engine 80 configured to provide mechanical energy to a generator 82, which is configured to convert the mechanical energy into electrical power.

In the exemplary embodiment, engine 80 is an internal combustion engine that operates on a combustible fuel, such as propane, channeled from tanks 44 and 46. Alternatively, engine 80 may be a turbine engine. Generally, engine 80 may be any type of engine which operates on the fuel contained within tanks 44 and 46. Engine 80 is coupled to generator 82 via a motor shaft (not shown) such that mechanical energy produced by engine 80 is transferred through the shaft to generator 82, which converts the mechanical energy into electrical power. The electrical energy produced by generator 82 is distributed to various loads connected to energy supply module 10 as described in further detail below. Generator 82 may also include a battery (not shown) or other charge-storing device such that electrical power generated by generator 82 may be discharged at a later time. Note that the duration of module 10 operation from the power provided by generator 82 is based on the amount of fuel in tanks 44 and 46 and on the required energy of the loads connected to module 10.

Upper level 48 of energy supply module 10 also includes a plurality of firewalls 84 that are configured to form a protective case that encloses engine 80 and generator 82. Firewalls 84 provide a fire barrier to separate engine 80 and generator 82 from at least tanks 44 and 46, on-demand water heater 50, electric control panels 52 and 54, and other equipment located on upper level 48. As such, should a malfunction occur in engine 80 or generator 82, firewalls 84 are configured to contain any resulting effect of such a malfunction to prevent them from affecting other components of module 10. Additionally, firewalls 84 serve as a noise deflector to reduce the volume of sound emanating from module 10 due to engine 80 and generator 82.

In the exemplary embodiment, lower level 42 of the interior of second side 16 also includes a fuel fill valve 86 and fuel tank bleed valves 88 that are accessible via opening access panel 76 on second side wall 30. Fill valve 86 is configured to enable a user to fill tanks 44 and 46 with fuel for use by engine 80. Bleed valves 88 are placed near fill valve 86 to allow liquid propane or natural gas to exit the tank once the tanks 44 and 46 are full and refueling should stop. Furthermore, each tank 44 and 46 includes an electronic shut-off valve 90 configured to terminate the flow of fuel from each tank 44 and 46 when activated by a user.

Figure 7:
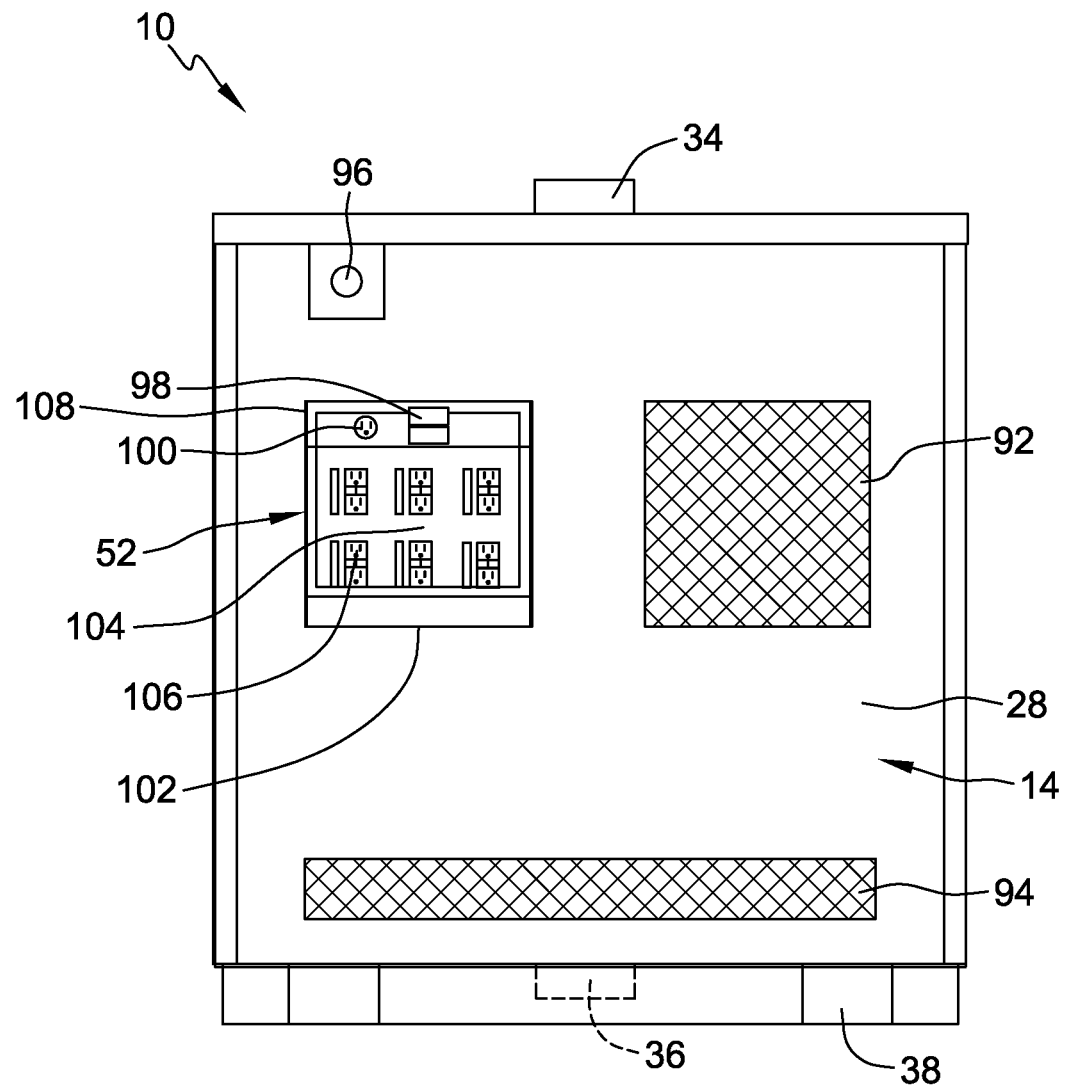
FIG. 7 is a schematic first end view of an exterior of the exemplary energy supply module shown in FIG. 1.

FIG. 7 is a schematic view of an exterior of first end 14 of energy supply module 10. First end 14 extends between first and second sides 12 and 16 of module 10. Similar to sides 12 and 16 as described above, first end 14 includes first end wall 28 of housing 24 coupled to frame members 40. Furthermore, first end 14 also includes a pair of transport openings 38 configured to receive a transport means for faster and easier loading, unloading, and moving of module 10. In the exemplary embodiment, first end wall 28 includes an engine intake vent 92 located in an upper portion of first end wall 28 proximate engine 80. Engine 80 draws fresh air through engine intake vent 92 for use in engine 80 operation. Vent 92 may also be used as an exhaust vent to discharge exhaust air from engine 80. First end wall 28 also includes a tank vent 94 located proximate second tank 46 in a lower portion of first end wall 28. In the event of a fuel leak from one of tanks 44 or 46, tank vent 94 is configured to allow the leaked fuel to exit module 10 to prevent fuel build-up within module 10. Also included in first end wall 28 is an emergency stop 96 that may be activated by a user to terminate operation of energy supply module 10. More specifically, activation of emergency stop 96 is configured to at least activate tank shut off valves 90 (shown in FIG. 6) to cut off fuel flow to engine 80. Emergency stop 96 may also terminate operation of engine 80 itself and/or terminate operation of generator 82 and/or control panels 52 and 54.

In the exemplary embodiment, first end wall 28 of energy supply module 10 includes first control panel 52 configured to control the distribution of electrical energy from generator 82 (shown in FIG. 6) to various loads coupled to module 10. First control panel 52 includes various gauges and displays. For example, first control panel 52 includes at least a voltage output gauge 98 configured to display to a user an amount of power being distributed by generator 82. Furthermore, first control panel 52 also includes a power inlet 100 configured to provide power to the battery that operates the fuel igniter on hot water heater 50. Moreover, a cable access slot 102 is defined in first end wall 28 proximate first control panel 52 to provide user access to cabling within the interior of energy supply module 10.

In the exemplary embodiment, first control panel 52 also includes a removable power distribution panel 104 having a plurality of electrical connectors 106 defined thereon. Energy supply module 10 includes a plurality of removable distribution panels 104 that each include a variety of electrical connector 106 combinations to provide multiple different electrical configurations simultaneously. Each power distribution panel 104 is detachable from control panels 52 and 54 such that a user may select the distribution panel 104 that includes an electrical connector 106 configuration best suited for the desired application. As such, each distribution panel 104 is configured to simultaneously provide power to various load types. For example, each distribution panel 104 may include one or more of the following electrical connectors 106: 15 amp receptacles at 120 volts AC electric, 20 amp receptacles at 120 volts and 240 volts AC electric (straight blade connectors and twist interlocking versions) 30 amp at 120 volts or 240 volts AC electric (straight blade connectors and twist interlocking versions) 50 amp at 120/240 volts AC electric, (straight blade connectors and twist interlocking versions). Electrical connections 106 may also include a ground fault circuit interrupter (GFCI) to detect current leaking to ground and interrupt the circuit.

In the exemplary embodiment, power distribution panel 104 includes electrical circuitry configured to regulate the received electrical power from generator 82 to a desired voltage/amperage and frequency. Alternatively, such regulatory circuitry may remain with energy supply module 10 when distribution panel 104 is removed from one of control panel 52 or 54. When removable power distribution panel 104 is coupled to generator 82 as described herein, electrical connectors 106 are configured to mechanically and/or electrically receive a plug from a load to provide the power source connection between the load and generator 82. Each removable power distribution panel 104 also includes a quick connect mechanism (not shown) to facilitate connection or removal of distribution panel 104 from control panel 52 or 54. The quick connect mechanism allows a user to quickly and easily remove one distribution panel 104 from module 10 and couple another panel 104 that suits the user's desired application. Electrical control panel 52 also includes a transparent protective cover 108 that both protects the sensitive electronics of distribution panel 104 from the elements and allows a user to be able to view displays, such as voltage output display 98, on control panel 52.

Figure 8:
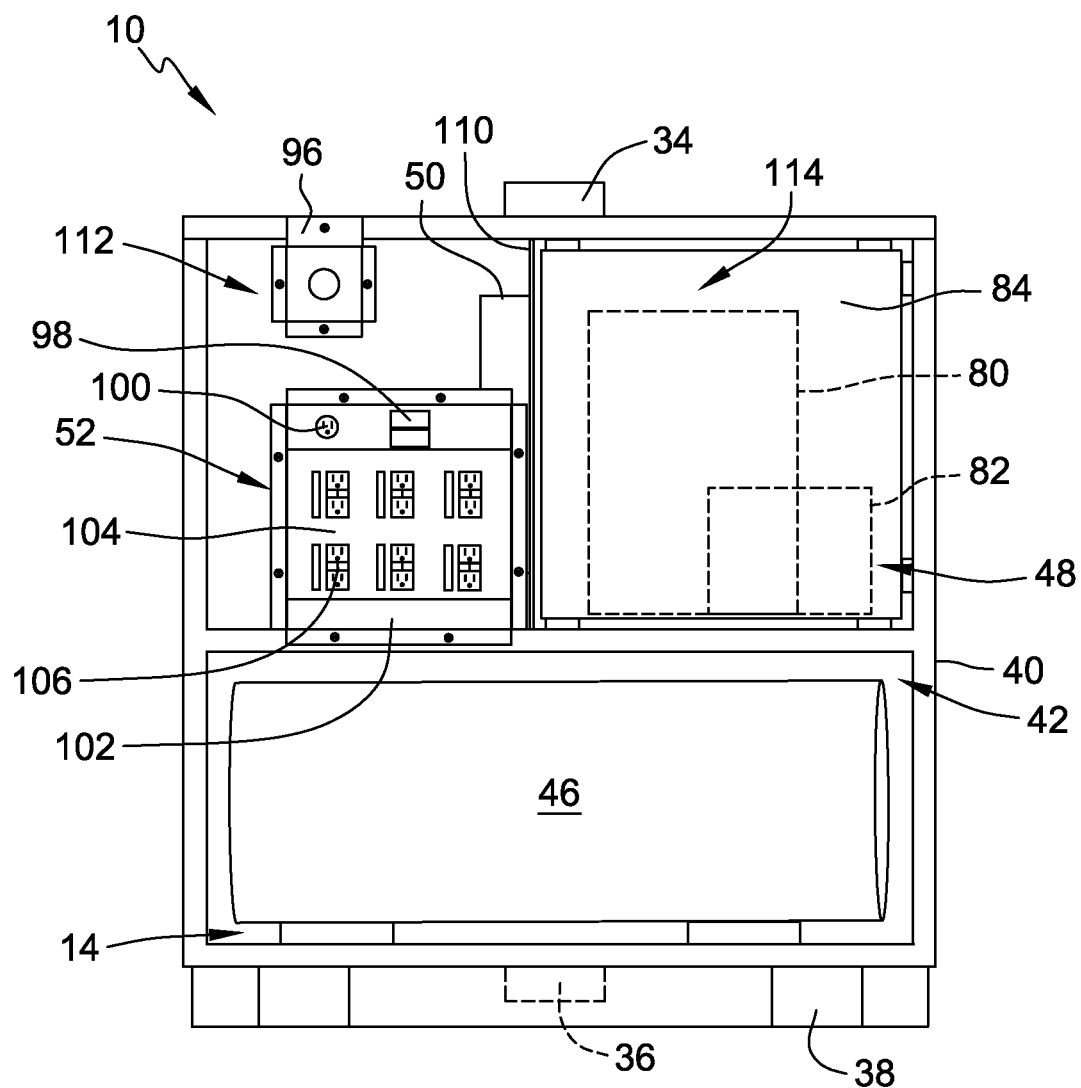
FIG. 8 is a schematic first end view of an interior of the exemplary energy supply module shown in FIG. 1.

FIG. 8 is a schematic view of an interior of first end 14 of energy supply module 10 having first end wall 28 removed. As described above, module 10 includes lower level 42 and upper level 48. Viewing the interior of first end 14 only second tank 46 is visible on lower level 42. Upper level 48 is divided by a second dividing wall 110 that is substantially perpendicular to first dividing wall 56. Second dividing wall 110 divides upper level 48 into a first portion 112 containing first and second control panels 52 and 54 and on-demand hot water heater 50 and a second portion 114 containing engine 80 and generator 82. First portion 112 may also contain any equipment held within storage area 58. First control panel 52 and emergency stop 96 are at least partially mounted to frame 40 such that first end wall 28 may be removed without requiring removal of first control panel 52 and emergency stop 96.

In the exemplary embodiment, energy supply module 10 has a number of different modes of operation. The first of which is a water heating only mode where module 10 operates to only provide a supply of heated water and not electrical energy. When a user selects the water heating only mode using one of first or second control panels 52 or 54, module 10 activates fuel sensor 60 located in lower level 42 to determine if there is a possible fuel leak from one of tanks 44 or 46. If sensor 60 does not detect a fuel leak, then sensor 60 sends a signal to at least one of tank shut-off valves 90 to open and channel fuel to on-demand water heater 50. The fuel is then ignited by a battery operated ignition device within heater 50 such that no electric energy is required from generator 82. Water is then channeled into energy supply module 10 water inlet 66 and routed through water heater 50 for heating before being discharged through water outlet 68 for use at the site. In the event that sensor 60 does detect a fuel leak, then sensor 60 sends a signal to tank valves to close to or confirm that they are closed. Sensor 60 is also configured to send a signal to at least one of control panels 52 and/or 54 to provide a visual and/or audible alarm to the user indicating a fuel leak. During operation of energy supply module 10 in water heating mode, electrical energy is not required from module 10 and fuel is supplied only to water heater 50 to enable module 10 to provide heated water to the user for a longer duration than would be available of module 10 were also generating electricity.

Energy supply module 10 also includes a power only mode where module operates only to provide a supply of electrical energy and not hot water. Upon selection of the power only mode, module 10 activates fuel sensor 60 in a similar manner as described above with respect to the hot water only mode of operation. If sensor 60 senses a fuel leak, it triggers the same alarms as described above to indicate the leak to the user. When no leak is sensed, sensor 60 sends a signal to at least one of tank valves 90 to open and channel fuel to engine 80. The fuel is then ignited and consumed by engine 80 to produce mechanical energy. The mechanical energy is transferred to generator 82 for conversion into electrical power. In the exemplary embodiment, the electrical power is channeled to various loads coupled to module 10 through removable distribution panels 104 of at least one of control panels 52 and 54. Alternatively, or in combination, energy supply module may channel a portion of the generated electrical power to a battery (not shown) for later use. The battery may be either a battery external to module 10 or stored in module 10, such as, within storage area 58. During operation of energy supply module 10 in the power only mode, hot water is not required from module 10 and fuel is supplied only to engine 80 to enable module 10 to provide electricity to the user for a longer duration than would be available if module 10 were also heating water.

The final mode of operation for energy supply module 10 is a power and hot water mode where module 10 simultaneously provides a supply of hot water and electricity for distribution to the various loads coupled to module 10 through panels 52 and/or 54 and water inlet 66 and outlet 68. More specifically, module 10 distributes hot water to a first load and distributes electricity to a second load, wherein the first and second loads are different apparatuses coupled to module 10. Alternatively, module 10 may provide both electricity and hot water to the same load. When a user selects the power and water mode, module 10 activates fuel sensor 60 in a similar manner as described above with respect to the hot water and power only modes of operation. If sensor 60 senses a fuel leak, it triggers the same alarms as described above to indicate the leak to the user. When no leak is sensed, sensor 60 sends a signal to at least one of tank valves 90 to open and channel fuel to both on-demand hot water heater 50 and engine 80. As such, hot water heater 50 is continuously supplied fuel to be able to heat water flowing through energy supply module 10 or to remain heated when not currently being used. Simultaneously, engine 80 is supplied fuel to provide generator 82 with mechanical energy that generator converts into electrical energy and channels to removable power distribution panels 104 coupled to control panels 52 and 54 to power various loads coupled to module 10.

Figure 9:
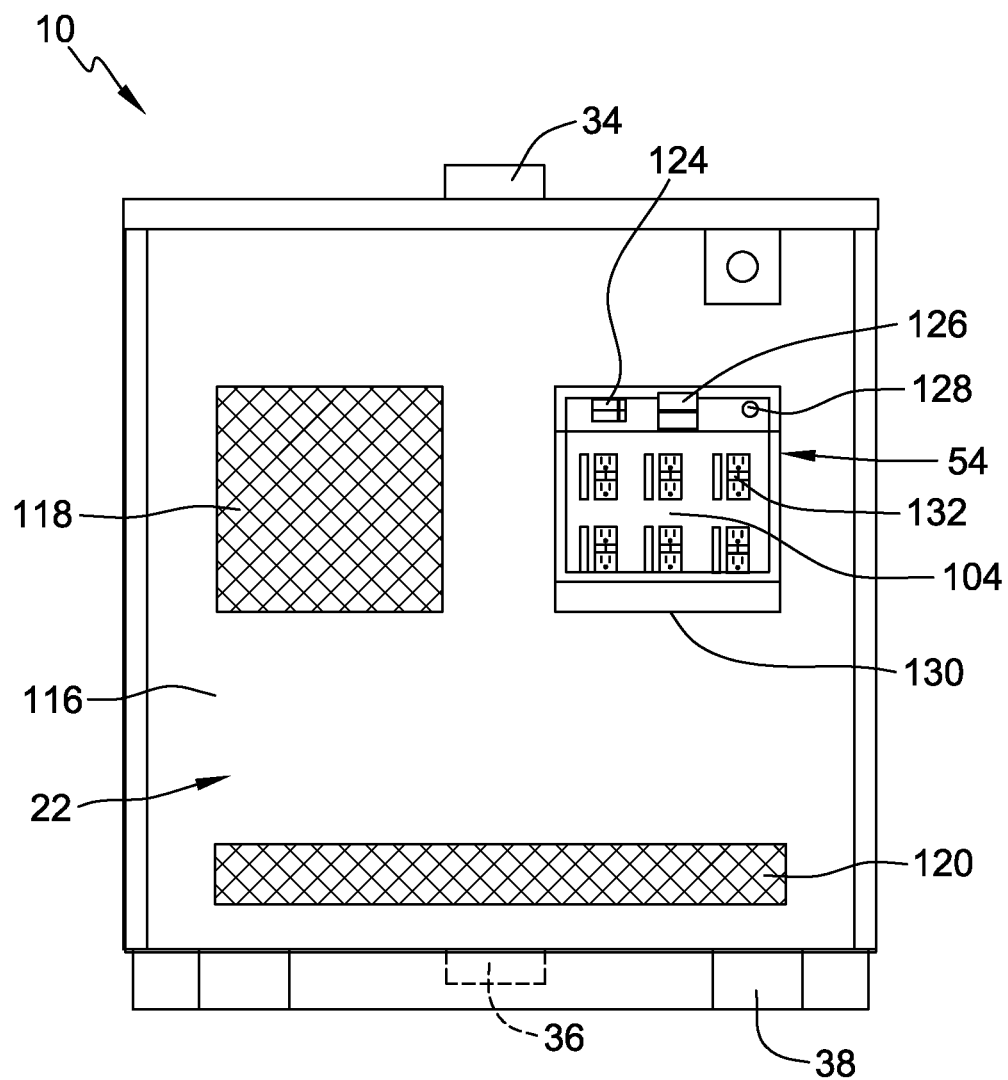
FIG. 9 is a schematic second end view of an exterior of the exemplary energy supply module shown in FIG. 1.

FIG. 9 is a schematic view of an exterior of second end 22 of energy supply module 10. Second end 22 extends between first and second sides 12 and 16 of module 10 and is parallel to first end 14. Similar to sides 12 and 16 as described above, second end 22 includes a second end wall 116 of housing 24 coupled to frame members 40. Furthermore, second end 22 also includes a pair of transport openings 38 configured to receive a transport means for faster and easier loading, unloading, and moving of module 10. In the exemplary embodiment, second end 22 is substantially similar to first end 14 with the exception that the features of second end 22 are oppositely oriented compared to first end 14. More specifically, second end wall 116 includes a second an engine intake vent 118 that provides a source of fresh air to engine 80 (shown in FIG. 6) and a second tank vent 120 configured to allow fuel to exit module 10 in the event of a fuel leak from one of tanks 44 or 46. Duplicates of these vents positioned on opposing ends 14 and 22 allows for better flow of air through energy supply module 10 for a better supply of fresh air to engine 80 and for faster venting of potentially leaked fuel in lower level 42. Furthermore, second end wall 116 includes a second emergency stop 122 that, when activated by a user, causes termination of at least one of tank 44 and 46, engine 80, and generator 82 (shown in FIG. 6) operation. Emergency stops 96 and 122 are located on opposing ends of module 10 such that a user can quickly and easily shut down module 10 if desired from either end 14 or 22.

In the exemplary embodiment, second end wall 116 includes second control panel 54 configured to control the distribution of electrical energy from generator 82 to various loads coupled to module 10. Similar to first control panel 52, second control panel 54 includes various gauges and displays. For example, second control panel 54 includes a main circuit breaker 124, at least one voltage output gauge 126, and a main module power switch 128. Alternatively, second control panel 54 may include more, fewer, or different gauges and displays as necessary to operate module 10 as described herein. Moreover, a second cable access slot 130 is defined in second end wall 116 proximate second control panel 54 to provide user access to cabling within the interior of energy supply module 10.

As described above with respect to first control panel 52, second control panel 54 also includes a removable power distribution panel 104 having a second plurality of electrical connectors 132 defined thereon. When removable power distribution panel 104 is coupled to generator 82 as described herein, electrical connectors 132 are configured to mechanically and/or electrically receive a plug from a load to provide the power source connection between the load and generator 82. In the exemplary embodiment, panel 104 coupled to first control panel 52 is different from panel 104 coupled to second control panel 54 such that first plurality of connectors 106 is different than second plurality of connectors 132 to enable module 10 to provide various amounts of power to various loads simultaneously. Alternatively, first and second control panels 52 and 54 may include identical panels 104 such that pluralities of connectors 106 and 132 are identical and are configured to power similar loads from both sides of energy supply module 10. In any embodiment, and in contrast to known generators, having panels 52 and 54 oriented on opposing sides of module 10 facilitates supplying power to various types of loads that are positioned on opposing ends or sides of energy supply module 10 without needing as much cabling as required in known generators.

Figure 10:
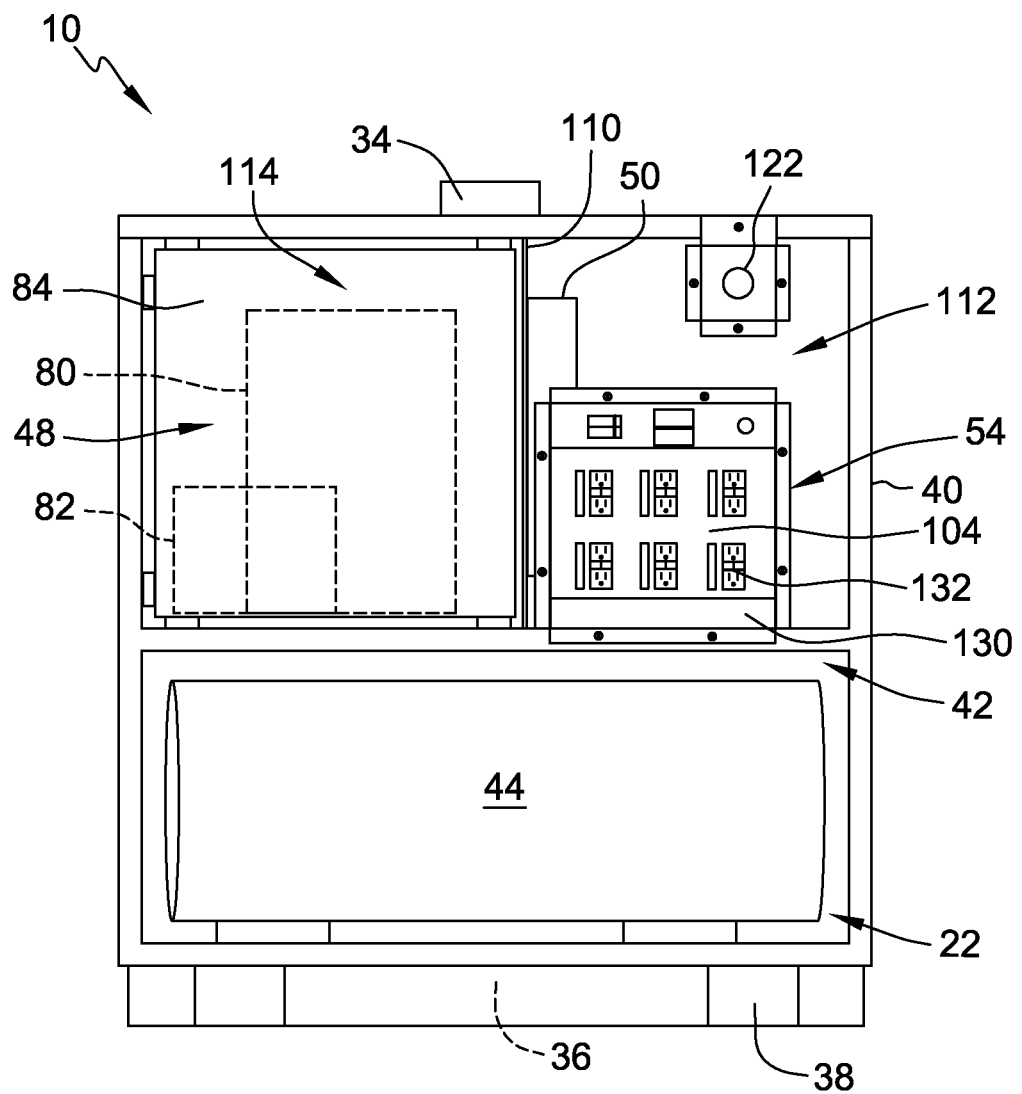
FIG. 10 is a schematic second end view of an interior of the exemplary energy supply module shown in FIG. 1.

FIG. 10 is a schematic view of an interior of second end 22 of energy supply module 10 having second end wall 116 removed. As described above, module 10 includes lower level 42 and upper level 48. Viewing the interior of second end 22 only first tank 44 is visible on lower level 42. Upper level 48 is divided by second dividing wall 110 that divides upper level 48 into first portion 112 containing first and second control panels 52 and 54 and on-demand hot water heater 50 and second portion 114 containing engine 80 and generator 82. First portion 112 may also contain any equipment held within storage area 58. Second control panel 54 and second emergency stop 122 are at least partially mounted to frame 40 such that second end wall 116 may be removed without requiring removal of second control panel 54 and emergency stop 122.

In the exemplary embodiment, energy supply module 10 also includes a plurality of sensors (not shown) configured to facilitate remote monitoring and operation of module 10. The plurality of sensors includes, but is not limited to, a fuel level sensor in tanks 42 and 44, a run/fail status sensor, at least one temperature sensor, a battery charge sensor, a voltage sensor indicating energy generated, and a voltage sensor indicating energy distributed. These sensors may be included as part of a monitoring system (not shown) which allows users to monitor the operation of energy supply module 10 from a remote site. These monitoring capabilities also eliminate the need for field support users to travel to the site to perform this function. Moreover, energy supply modules 10 may be configured to automatically start and/or stop when remotely activated by mechanical, electrical, or cellular, wireless networks, or satellite communication.

Furthermore, it is contemplated that two or more modules 10 may be situated side-by-side or in near locations, whether on adjacent trailer chassis, on a concrete pad or other ground surface, or on a single or multiple railway cars. Providing multiple energy supply modules 10 in a single location facilitates the continuous supply of electric power and/or hot water when one module 10 is inoperable due to re-fueling, maintenance, or other reason, and the simultaneous provision of electric energy, whether individually, in various combinations, or cumulatively by modules 10.

Exemplary embodiments of an energy supply module are described herein. The energy supply module includes at least one fuel tank positioned on a lower level. The fuel tanks supply fuel to an engine and an on-demand hot water heater positioned on an upper level. The engine is coupled to a generator that is configured to generate electrical power and channel it to at least one electrical control panel. Each of the control panels includes a removable power distribution panel configured to receive various electrical loads that are coupled to the energy supply module. The hot water heater is configured to heat a supply of water channeled into the module and then discharge the heated water for use at the site on which module is located. As such, the energy supply module described herein functions as a single, stacked, compact unit that is self-contained and able to be monitored remotely. The module is self-contained and is independent of any outside resources, with the exception of re-fueling the fuel tanks, that may be needed to generate and distribute electric power and/or hot water. Thereby, the energy supply module may operate independently of personnel, outside of occasional temporary maintenance, refueling, and transportation the module.

A further advantage of the energy supply module described herein is its ability to be easily and rapidly deployed to various sites at a lower cost than known generators. Each module is smaller than at least some known generators, and, therefore, may be stacked two units high and two units across such that twelve to sixteen modules may fit on a standard transport vehicle. Moreover, each module includes multiple control panels with removable distribution panels that facilitate powering more loads simultaneously at different load configurations than other known generators. Furthermore, because each energy supply module is a self-contained unit, it stores all of its own fuel, connection panels, and cabling to facilitates cheaper, faster, and easier deployment and ease of use.

Exemplary embodiments of an energy supply module and methods for assembling the same are described above in detail. The methods and assemblies are not limited to the specific embodiments described herein, but rather, components of assemblies and/or steps of the methods may be utilized independently and separately from other components and/or steps described herein. For example, the methods may also be used in combination with other portable power generation assemblies, and are not limited to practice with only the energy supply module and assemblies as described herein. Rather, the exemplary embodiment can be implemented and utilized in connection with many other power generation applications.

Although specific features of various embodiments of the invention may be shown in some drawings and not in others, this is for convenience only. In accordance with the principles of the invention, any feature of a drawing may be referenced and/or claimed in combination with any feature of any other drawing. Further, although words such as "top" and "bottom" are used throughout the specification, there is no absolute orientation in the universe.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An energy supply module configured to provide at least one of electricity and hot water to at least one load coupled thereto, said energy supply module comprising:
   a plurality of frame members that define an upper level and a lower level;
   an engine positioned on said upper level;
   a generator coupled to said engine and positioned on said upper level, said generator configured to generate a supply of electricity for distribution to the at least one load;
   a hot water heater positioned on said upper level, said hot water heater configured to provide a supply of hot water to the at least one load; and
   a pair of electric control panels coupled to said generator and positioned on opposing sides of said energy supply module, wherein each electric control panel includes at least one of a plurality of interchangeable power distribution panels removably coupled thereto, each of said plurality of power distribution panels including a plurality of electrical connectors configured to receive a corresponding connector from the at least one load, wherein said plurality of interchangeable power distribution panels are interchangeable based on a desired configuration of said plurality of electrical connectors.

2. The energy supply module in accordance with claim 1 further comprising at least a pair of electric control panels positioned on opposing sides of said energy supply module.

3. The energy supply module in accordance with claim 2 further comprising a plurality of power distribution panels, wherein each electric control panel includes at least one power distribution panel removably coupled thereto, each of said plurality of power distribution panels including a plurality of electrical connectors, wherein each electrical connector is configured to receive a corresponding connector from the at least one load.

4. The energy supply module in accordance with claim 3, wherein a first of said plurality of power distribution panels includes a first configuration of electrical connectors and a second power distribution panel includes a second configuration of electrical connectors, wherein the first configuration is different from the second configuration.

5. The energy supply module in accordance with claim 1 further comprising at least one fuel tank positioned in said lower level, said fuel tank configured to provide a supply of fuel to said engine and said hot water heater.

6. The energy supply module in accordance with claim 1 further comprising a storage area defined in said upper level, said storage area configured to store equipment necessary for said energy supply module operation.

7. The energy supply module in accordance with claim 1 further comprising:
   a lift pin configured to facilitate lifting said energy supply module, said lift pin positioned on a top surface; and
   a stacking sleeve configured to receive said lift pin to facilitate stacking a first energy supply module on top of a second energy supply module.

8. The energy supply module in accordance with claim 1 further comprising a plurality of transport openings configured to receive at least a portion of a transport vehicle to facilitate relocating said energy supply module.

9. The energy supply module in accordance with claim 1 further comprising a fuel sensor positioned in said lower level, said fuel sensor configured to detect a fuel leak.

10. An energy supply module configured to provide electricity to at least one load coupled thereto, said energy supply module comprising:
   a plurality of frame members that define an upper level and a lower level;
   an engine positioned on said upper level;
   a generator coupled to said engine and positioned on said upper level, said generator configured to generate a supply of electricity for distribution to the at least one load; and
   a pair of electric control panels coupled to said generator and positioned on opposing sides of said energy supply module, wherein each electric control panel includes at least one of a plurality of interchangeable power distribution panels removably coupled thereto, each of said plurality of power distribution panels including a distinct configuration of electrical connectors configured to receive a corresponding connector from the at least one load.

11. The energy supply module in accordance with claim 10, wherein a first of said plurality of power distribution panels includes a first configuration of electrical connectors and a second power distribution panel includes a second configuration of electrical connectors, wherein the first configuration is different from the second configuration.

12. The energy supply module in accordance with claim 10 further comprising a hot water heater positioned on said upper level, said hot water heater configured to provide a supply of hot water to the at least one load.

13. The energy supply module in accordance with claim 12 further comprising at least one fuel tank positioned in said lower level, said fuel tank configured to provide a supply of fuel to at least one of said engine and said hot water heater.

14. The energy supply module in accordance with claim 13 further comprising a fuel sensor positioned in said lower level, said fuel sensor configured to detect a fuel leak from said at least one fuel tank.

15. The energy supply module in accordance with claim 10 further comprising:
   a lift pin configured to facilitate lifting said energy supply module, said lift pin positioned on a top surface; and
   a stacking sleeve configured to receive said lift pin to facilitate stacking a first energy supply module on top of a second energy supply module.

16. The energy supply module in accordance with claim 10 further comprising a plurality of transport openings configured to receive at least a portion of a transport vehicle to facilitate relocating said energy supply module.

17. A method of assembling an energy supply module configured to provide electricity to at least one load coupled thereto, said method comprising:
   defining an upper level and a lower level of the energy supply module with a plurality of frame members;
   positioning an engine on said upper level;
   coupling a generator to the engine on said upper level, wherein the generator is configured to generate a supply of electricity for distribution to the at least one load;
   coupling a pair of electric control panels to the generator, wherein the electric control panels are coupled to opposing sides of the energy supply module; and
   removably coupling at least one of a plurality of interchangeable power distribution panels to each electric control panel, wherein each of the plurality of power distribution panels includes a plurality of electrical connectors configured to receive a corresponding connector from the at least one load, wherein the plurality of interchangeable power distribution panels are interchangeable based on a desired configuration of the electrical connectors.

18. The method in accordance with claim 17, wherein removably coupling at least one of a plurality of power distribution panels to each electric control panel further comprises:
   coupling a first power distribution panel of said plurality of power distribution panels including a first configuration of electrical connectors to a first side of the energy supply module;
   removing the first power distribution panel from the first side of the energy supply module; and
   coupling a second power distribution panel including a second configuration of electrical connectors to the first side of the energy supply module, wherein the first configuration is different from the second configuration.

19. The method in accordance with claim 17 further comprising positioning a hot water heater in the upper level, wherein the hot water heater is configured to provide a supply of hot water to the at least one load.

20. The method in accordance with claim 19 further comprising positioning at least one fuel tank in the lower level, said fuel tank configured to provide a supply of fuel to at least one of said engine and said hot water heater.

* * * * *